United States Patent [19]
Howe

[11] Patent Number: 6,167,285
[45] Date of Patent: *Dec. 26, 2000

[54] METHOD AND APPARATUS FOR ALLOWING CORDLESS COMMUNICATION ATTEMPTS IN A MULTIPLE MODE SYSTEM

[75] Inventor: Walter Wesley Howe, Atlanta, Ga.

[73] Assignee: GTE Wireless Service Corporation, Alpharetta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 09/123,021

[22] Filed: Jul. 27, 1998

[51] Int. Cl.⁷ .................................................. H04Q 7/20
[52] U.S. Cl. ........................................ 455/552; 455/426
[58] Field of Search ................... 455/417, 425, 455/426, 434, 436, 455, 462, 464, 509, 512, 513, 516, 552, 553, 465, 60, 561, 550, 556

[56] References Cited

U.S. PATENT DOCUMENTS

| | | | |
|---|---|---|---|
| 5,230,081 | 7/1993 | Yamada et al. | 455/33.1 |
| 5,406,615 | 4/1995 | Miller, II et al. | 455/552 |
| 5,442,680 | 8/1995 | Schellinger et al. | 455/552 |
| 5,504,803 | 4/1996 | Yamada et al. | 379/59 |
| 5,574,775 | 11/1996 | Miller, II et al. | 455/444 |
| 5,594,782 | 1/1997 | Zicker et al. | 379/63 |
| 5,625,672 | 4/1997 | Yamada | 379/59 |
| 5,673,309 | 9/1997 | Akhavan | 455/461 |
| 5,675,629 | 10/1997 | Raffel et al. | 455/552 |
| 5,774,805 | 6/1998 | Zicker | 455/426 |
| 5,787,354 | 7/1998 | Gray et al. | |
| 5,887,259 | 3/1999 | Zicker et al. | 455/434 |

*Primary Examiner*—Nay Maung
*Assistant Examiner*—Jean Aliand Gelin
*Attorney, Agent, or Firm*—Leonard Charles Suchyta

[57] ABSTRACT

In a multiple mode communication system (29), a radio communication device (22) selectively communicates, using a common pool of channels (42), through a cordless base station (30) and a cellular network having a plurality of cellular base stations (24). The radio communication device (22) determines and stores local station identifiers (88) for the cellular base stations (24) which are broadcasting message streams (48) over control channels (46) in a cordless radio coverage area (26) of the radio communication device (22). The radio communication device (22) transmits a message to the cordless base station (30) when a detected cellular base station identifier (51) matches one of the determined local station identifiers (88). The radio communication device (22) is prevented from transmitting a message when the detected cellular base station identifier (51) matches none of the local station identifiers (88).

18 Claims, 5 Drawing Sheets

METHOD AND APPARATUS FOR ALLOWING CORDLESS COMMUNICATION ATTEMPTS IN A MULTIPLE MODE SYSTEM

TECHNICAL FIELD OF THE INVENTION

The present invention relates generally to radio communication devices. More specifically, the present invention relates to radio communication devices which selectively communicate over a cellular network and a cordless network using common radiofrequency channels.

BACKGROUND OF THE INVENTION

Multiple mode communication systems use common components for multiple functions. For example, a multiple mode communication system may use a radio communication device, such as a portable radiotelephone handset, to communicate both in a cordless mode of operation and a cellular mode of operation. In the cordless mode of operation, the handset typically communicates at low power with a cordless base station having a radio coverage area of a few hundred feet. The cordless base station may couple to one or more local loops of a public switched telecommunication network (PSTN). Thus, the handset may communicate in the cordless radio coverage area through the cordless base station with telephonic devices that couple to the PSTN.

In the cellular mode of operation, the handset typically communicates at moderate power with a cellular base station having a much larger radio coverage area relative to the cordless radio coverage area. Accordingly, the handset may be located a few miles away from the cellular base station. The cellular base station typically couples to the PSTN through a mobile telephone switching office (MTSO). In a typical cellular system, multiple cellular base stations provide coverage to a geographic area. Each of these cellular base stations overlap portions of their coverage to allow handoffs between cellular base stations to occur. Thus at any specific, confined geographic location there is one, and frequently more than one, cellular base station providing coverage for that particular location. The handset may then communicate through one of the cellular base stations with telephonic devices that couple to the PSTN.

In a typical situation, a cordless base station may be located near a user's residence or work place. Cordless mode operations are available through the handset when the user is near the user's residence or work place, and cellular mode operations are available in other locations.

The earliest multiple mode radiotelephones combined separate cordless transceivers and cellular transceivers in a common handset. The cordless and cellular transceivers operated in different frequency bands using different communication protocols. Potential interference between cordless and cellular operation was not a problem. However, the increased costs, weight, and power consumption of this dual transceiver approach made the approach impractical.

Subsequent generations of multiple mode radiotelephones use a common frequency band, or common pool of channels, and at least compatible communication protocols for cordless mode and cellular mode operations. Since a single transceiver may be used for both cordless and cellular mode operations, cost, weight, and power consumption improvements result. However, a potential for interference exists between the cordless mode and cellular mode operations because channels used for cordless operations in one location may cause interference with the same channels being used for nearby cellular operations.

One prior art multiple mode communication system is configured so that a cordless base station monitors conventional reverse cellular channels to determine which cellular channels are not in use where the cordless base station is located. Once the cordless base station finds a clear channel, it entirely consumes the channel by broadcasting a pilot signal which mimics a conventional cellular control channel. Unfortunately, the use of a continuous pilot channel prevents the pilot channel from carrying user communications which leads to an inefficient use of the frequency spectrum. Moreover, the constant transmission of pilot signals from various cordless base stations increases the background noise for all cordless and cellular mode communications taking place in the surrounding area and further increases interference.

Another prior art multiple mode communication system, such as the one described in U.S. Pat. No. 5,594,782 to Zicker et al., and entitled "Multiple Mode Personal Wireless Communication System", employs non-piloted cordless operation to reduce the likelihood of interference. In other words, the cordless base station does not constantly transmit a radiofrequency pilot signal, i.e. the cordless base station is RF-silent unless communication is first initiated by a radiotelephone. Thus, interference from the constantly transmitted pilot signal is prevented. This prior art system causes the radiotelephone to initiate communication with the cordless base station by transmitting an access message to the cordless base station when the radiotelephone determines that it is in a geographical location where communication with the cordless base station might be possible.

This prior art system causes the radiotelephone to detect the radio frequencies of the control channels transmitted by the cellular land stations at the geographic location at which the radiotelephone is currently located. The radiotelephone is then configured to compare a cellular base station identifier extracted from the detected control channel to a preprogrammed list of cellular base station identifiers, referred to herein as local station identifiers, that may be detectable within the cordless radio coverage area.

When the radiotelephone finds a match between the detected base station identifier and a local station identifier from the preprogrammed list, the radiotelephone is enabled to transmit a cordless access message to attempt to locate its corresponding cordless base station. However, when the detected station identifier matches none of the local station identifiers from the preprogrammed list, the radiotelephone will not attempt to locate its corresponding cordless base station, thus eliminating unnecessary transmissions.

In order to generate the preprogrammed list of local station identifiers, during or prior to activation of the radiotelephone, this prior art system compares a proposed geographic location of the cordless base station with computer modeled predictive propagation plots of the cellular system in order to determine the strongest cellular base stations near the proposed location. The cellular base stations which are predicted to have the strongest signals, known as better-servers, are then placed in the preprogrammed list of local station identifiers.

While this prior art system reduces the likelihood of interference by reducing the number of unnecessary transmissions, this system requires a programming process to be performed per paired unit (i.e. radiotelephone and cordless base station combination) for each specific geographic location it is to be used in. The programming process introduces additional handling and cost, and slows down system delivery time since unit pairs cannot be preprogrammed for operation and placed in stock. In addition, error is introduced in the predictive modeling and geographic location processes employed by this prior art system. Moreover, the location process employed by the radiotelephone poses problems when the operating frequencies are changed or reassigned within the cellular network, or if cells associated with a particular cellular base station are divided. When the frequencies are altered or when the cells are divided, the radiotelephone may erroneously transmit cordless network access messages and increase the number of unnecessary transmissions, or fail to transmit an access message at the appropriate location to permit subsequent cordless mode operation.

Thus, when the frequencies are altered or when the cells are divided, the frequency-dependent locating process must be correspondingly altered. This results in significant reprogramming effort and cost. In addition, there may be a programming delay between the actual frequency changes and the reprogramming of the components, during which the location process may cause the radiotelephone to erroneously transmit cordless network access messages or fail to transmit desirable access messages.

Therefore, what is needed is an automatic process for determining a list of local station identifiers, or better-server identifiers, for cellular base stations having a radio coverage area which overlies a radio coverage area of the cordless base station. Such a system should be able to update this list periodically in order to adapt to changes in the cellular frequency allocations.

SUMMARY OF THE INVENTION

Accordingly, it is an advantage of the present invention to provide an improved method and system for allowing a radio communication device in a multiple mode communication system to attempt communication with a cordless base station.

Another advantage of the present invention is to reduce the likelihood of interference imposed on the cellular network by cordless operation of the radio communication device.

Yet another advantage of this invention is automatic programming of registration parameters upon system activation and in response to changes in the cellular network frequency allocations.

The above and other advantages of the present invention are carried out in one form by a method for allowing a radio communication device to attempt communication with a cordless base station. In a multiple mode communication system, the radio communication device is configured to selectively communicate through a cellular network and a cordless base station using a common pool of channels. The cellular network has a plurality of cellular base stations. The method calls for selecting local control channels from a plurality of control channels. Each of the local control channels exhibits a better signal quality than nonselected ones of the control channels. The method further calls for determining a local station identifier for each of the local control channels, the local station identifiers identifying the cellular base stations broadcasting the local control channels. A cellular base station identifier is received at the radio communication device, the cellular base station identifier being transmitted over one of the plurality of control channels. A message is transmitted from the radio communication device when the received cellular base station identifier matches one of the local station identifiers.

The above and other advantages of the present invention are carried out in another form by a radio communication device configured to selectively communicate through a cellular network and a cordless base station using a common pool of channels, the cellular network having a plurality of cellular base stations. The radio communication device includes a controller configured to select local control channels from a plurality of control channels. Each of the local control channels exhibits an instantaneous signal quality which is greater than an instantaneous signal quality for nonselected ones of the control channels. The controller is further configured to determine local station identifiers for the local control channels, the local station identifiers identifying the cellular base stations broadcasting the local control channels. A receiver is coupled to the controller and is configured to receive a cellular base station identifier transmitted over one of the control channels. A transmitter is coupled to the controller and is configured to transmit a message when the received cellular base station identifier matches one of the local station dentifiers.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a frequency management chart which illustrates an exemplary common pool of channels used for cellular and cordless operations;

DETAILED DESCRIPTION OF THE PREFERRED EMBODIMENTS

Figure 1:
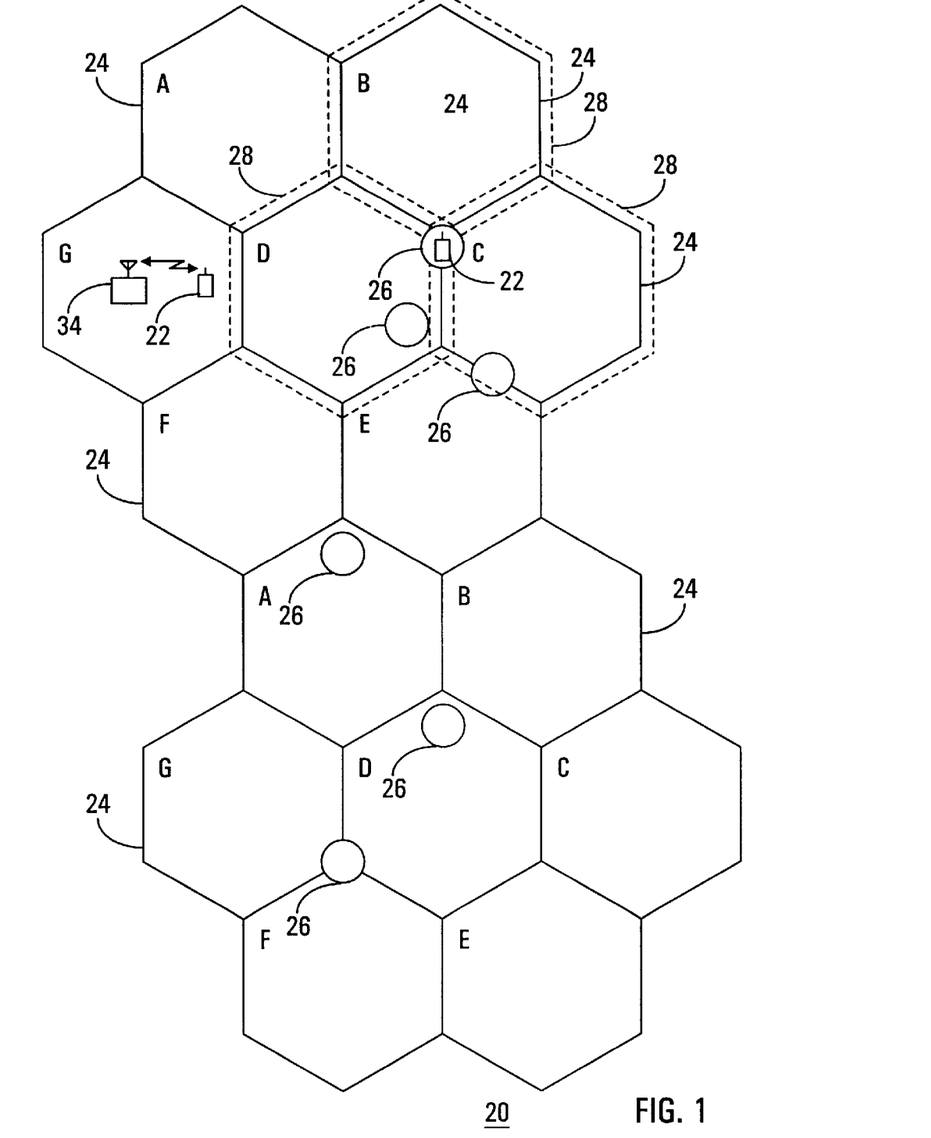
FIG. 1 shows a schematic view of an environment in which a radio communication device is located.

FIG. 1 shows a schematic view of an environment 20 in which a multiple mode radio communication device 22 is located. Environment 20 supports a cellular network defined by a grid of cells 24 and any number of cordless communication systems defined by cordless radio coverage areas 26. Environment 20 is illustrated with only two seven-cell clusters of cells 24 schematically shaped as hexagons and only a few of cordless radio coverage areas 26 schematically shaped as circles. Many more cells 24 and cordless radio coverage areas 26 may be included.

Various ones of cells 24 may be located near each other as may be various ones of cordless radio coverage areas 26. In addition, cells 24 overlap portions of their radio coverage areas, denoted by dashed lines 28, in order to facilitate handoffs between cells 24. Furthermore, cells 24 and cordless radio coverage areas 26 overlap one another. Desirably, each cordless coverage area 26 is substantially smaller than cells 24. Although not shown, other cellular systems may be overlaid on environment 20. In the preferred embodiment, the cellular system is compatible with conventional AMPS standards, and the cordless systems also utilize AMPS standard frequency channels and communication protocols. However, nothing prevents the principles of the present invention from being applied to other types of radio communication systems, such as personal communications service (PCS), specialized mobile radio (SMR), and so forth.

As illustrated in FIG. 1, environment 20 includes any number of multiple mode radio communication devices 22, of which two are shown. In the preferred embodiment radio communication devices 22 are radio telephone handsets utilized for voice communications. However, nothing prevents the principles of the present invention from being applied to other types of radio communication devices, such as portable or fixed combinations of data and telemetry equipment used for any of a wide variety of metering, alarm, location, and other diverse applications.

Figure 2:
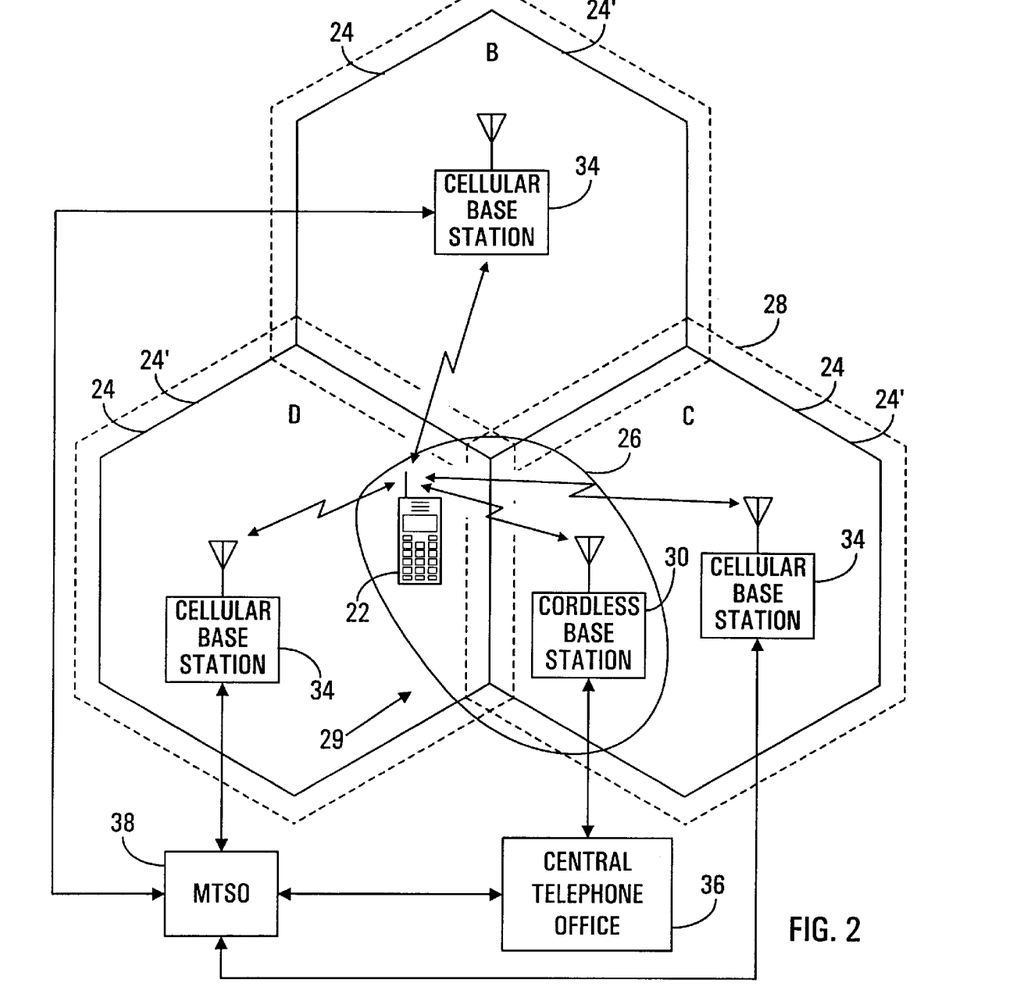
FIG. 2 shows a schematic view in which the radio communication device is included in a multiple mode communication system in a cordless radio coverage area.

FIG. 2 shows a schematic view in which radio communication device 22 is included in a multiple mode communication system 29 in one of cordless radio coverage areas 26. Generally, system 29 includes radio communication device 22 and a corresponding cordless base station 30. For clarity of illustration, radio communication device 22 is referred to hereinafter as handset 22. In addition, cordless base station 30 and handset 22 are preprogrammed to allow communication to occur between cordless base station 30 and handset 22. Those skilled in the art will recognize that system 29 may include any number of handsets 22 which are preprogrammed to communicate with cordless base station 30.

Cordless radio coverage area 26 overlies three cells 24' (B–D), cells 24' being a subset of cells 24. Each of cells 24 and 24' includes a cellular base station 34. The terms cellular base station and cordless base station are used herein to distinguish the two from one another, wherein "cellular" indicates a significantly larger radio coverage area than "cordless". Cellular base stations 34 may be land-based systems, satellite-based systems, and so forth. In addition, cordless base station 30 desirably refrains from operating at frequencies and using communication protocols which have historically been used for cordless telephony.

When located in an area where cordless radio coverage area 26 overlies cell 24', handset 22 may communicate through either cordless base station 30 or one of cellular base stations 34. Referring momentarily to FIG. 1, when outside of cordless radio coverage area 26, but still within the cellular network defined by cells 24, handset 22 can communicate only with one of cellular base stations 34.

Referring back to FIG. 2, cordless base station 30 couples to a central telephone office 36 through one or more wired loops. Cellular base stations 34 also couple to central telephone office 36 through a mobile telephone switching office (MTSO) 38 and appropriate trunks. Through central telephone office 36, user communications may be provided between handset 22 and other telephonic devices coupled to the public switch telephone network (PSTN) (not shown) via either cordless mode communications or cellular mode communications.

FIG. 3 shows a frequency management chart 40 which illustrates an exemplary common pool of channels 42 used for both cellular and cordless communications. For ease of illustration, FIG. 3 depicts a frequency management chart that describes an AMPS cellular system. Those skilled in the art will appreciate that the principles discussed below, in connection with chart 40, apply to current AMPS frequency management schemes, as well as to frequency management schemes used by other types of cellular systems. Channel numbers (listed as 1–666 in chart 40) identify discrete radiofrequency channels. Channels 1–333 are a designated A block grouping of radiofrequency channels consistent with an A system assignment. Likewise, channels 334–666 are a designated B block grouping of radiofrequency channels consistent with a B system assignment.

Each channel desirably represents a full duplex or bidirectional radiofrequency channel which has a forward portion and a reverse portion. The forward portion defines a link directed toward handset 22, while the reverse portion defines a link directed away from handset 22. Thus, when handset 22 tunes a receiver to a channel, they tune the receiver to the forward portion of the radiofrequency channel, S and when cordless base station 30 or cellular base station 34 tunes a receiver to a channel, they tune the receiver to the reverse portion of the radiofrequency channel. Each of handset 22, cordless base station 30, and cellular base station 34 may be set up to communicate on any channel identified in pool of channels 42.

However, as illustrated by FIGS. 1 and 3, handset 22, cordless base station 30, and cellular base station 34 need to restrict and otherwise manage their use of channels to minimize interference. FIG. 1 illustrates a seven cell reuse channel assignment plan well known in the cellular telephone arts. Pool of channels 42 is divided into diverse cellular subsets 44, indicated as vertical columns in chart 40. Each cellular subset 44 is configured so that its channels are non-contiguous. In other words, no two adjacent channels are included in any single cellular subset 44. Cellular subsets 44 (labeled A–G in FIGS. 1 and 3) are assigned to different cells 24, and cellular communications may use only channels included in the cellular subset 44 assigned to the cell 24 where communications are taking place. This reuse channel assignment plan maintains a minimum reuse distance between diverse locations where the same channels are reused. The greater this reuse distance, the less the risk of interference. Of course, those skilled in the art will appreciate that many other types of channel assignment plans may be used, including four channel reuse plans, sectoring, dynamic channel assignment, channel borrowing, and the like. In addition, the precise frequencies and number of channels included in pool of channels 42 are not relevant parameters for the purposes of the present invention.

Chart 40 also illustrates cellular control channels 46 (channels 313–354). Each of cellular base stations 34 (FIG. 2) generates a continuous message stream of digital information over one of control channels 46. Control channels 46 are used to identify the presence of cellular base stations 34, regulate cellular network access attempts, page cellular handsets, and for other signaling purposes.

Figure 4:
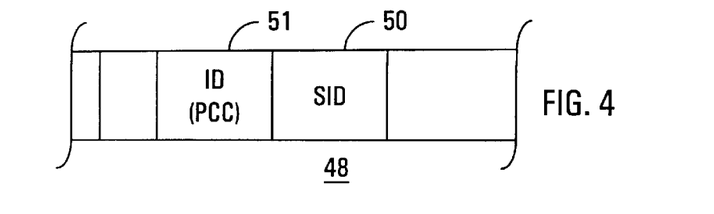
FIG. 4 shows a block diagram of a portion of an exemplary message stream which is broadcast over a control channel by an associated cellular base station.

FIG. 4 shows a block diagram of a portion of an exemplary message stream 48 which is broadcast over one of control channels 46 (FIG. 3) by an associated one of cellular base stations 34 (FIG. 2). Message stream 48 may include an overhead message which provides handset 22 with information on the cellular network, such as a system identification (SID) 50, and which access and paging channels are available in the cell 24 (FIG. 1).

Message stream 48 is also configured to include a cellular base station identifier (ID) 51. Cellular base station identifier 51 identifies one of cellular base stations 34 (FIG. 2) broadcasting control channel 46. In the preferred embodiment, cellular base station identifier 51 is unique for each of cellular base stations 34, and is sent in message stream 48 approximately every eight seconds. Alternatively, per convention in cellular systems, message stream 48 may include a digital color code (DCC). The digital color code is a two digit code distinguishing a particular channel from one on a similar frequency within common pool of channels 42 (FIG. 3). The combination of the DCC and the control channel 46 which is broadcasting the particular DCC can be utilized as cellular base station identifier 51.

Figure 5:
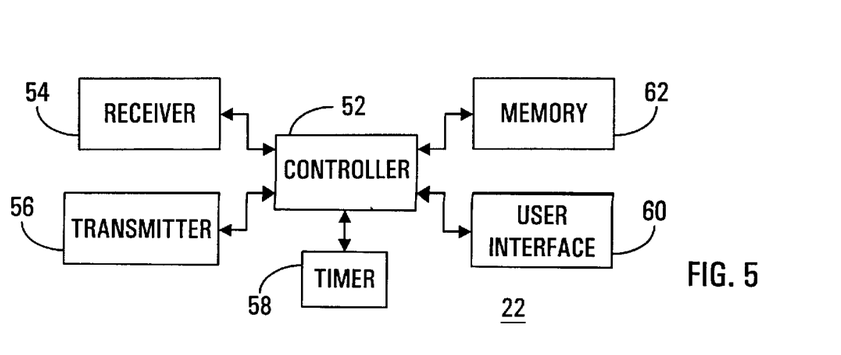
FIG. 5 shows a block diagram of the functional hardware included in the radio communication device in accordance with the present invention.

FIG. 5 shows a block diagram of the functional hardware included in handset 22 in accordance with the present invention. For clarity, standard operating elements well known to those skilled in the art and unimportant to the present invention are not shown in FIG. 5 or described in detail herein. In general, handset 22 includes a controller 52, which controls the operation of handset 22. Various components are coupled to or are in data communication with controller 52, such as a receiver 54, a transmitter 56, a timer 58, a user interface 60, and a memory 62. Controller 52 may, for example, be a conventional microprocessor circuit well known in the cellular telephony art.

Receiver 54, which is coupled to controller 52, is configured to receive signaling data and user communications over a channel selected from pool of channels 42 (FIG. 3). Transmitter 56 is also coupled to controller 52. Transmitter 56 is configured to transmit signaling data associated with conventional cellular telephone operations and user communications. Those skilled in the art will readily recognize that receiver 54 and transmitter 56 may be integrated into one transceiver assembly. Timer 58 is coupled to controller 52 and tracks the passage of time. User interface 60 is coupled to controller 52 and desirably includes keypad push buttons, a speaker, a microphone, a display, and other user interface devices well known in the art. Memory 62 is coupled to controller 36 and stores programming instructions that define the various processes described below. In addition, memory 62 stores various cellular operating parameters and various tables and lists of data used in the operation of handset 22.

Cordless base station 30 has a block diagram (not shown) similar to that shown in FIG. 5. However, receiver 54 and transmitter 56 of handset 22 operate on forward and reverse radiofrequency portions, respectively, of selected channels, while a corresponding receiver and transmitter of cordless base station 30 operate on reverse and forward radiofrequency portions, respectively, of selected channels.

Figure 6:
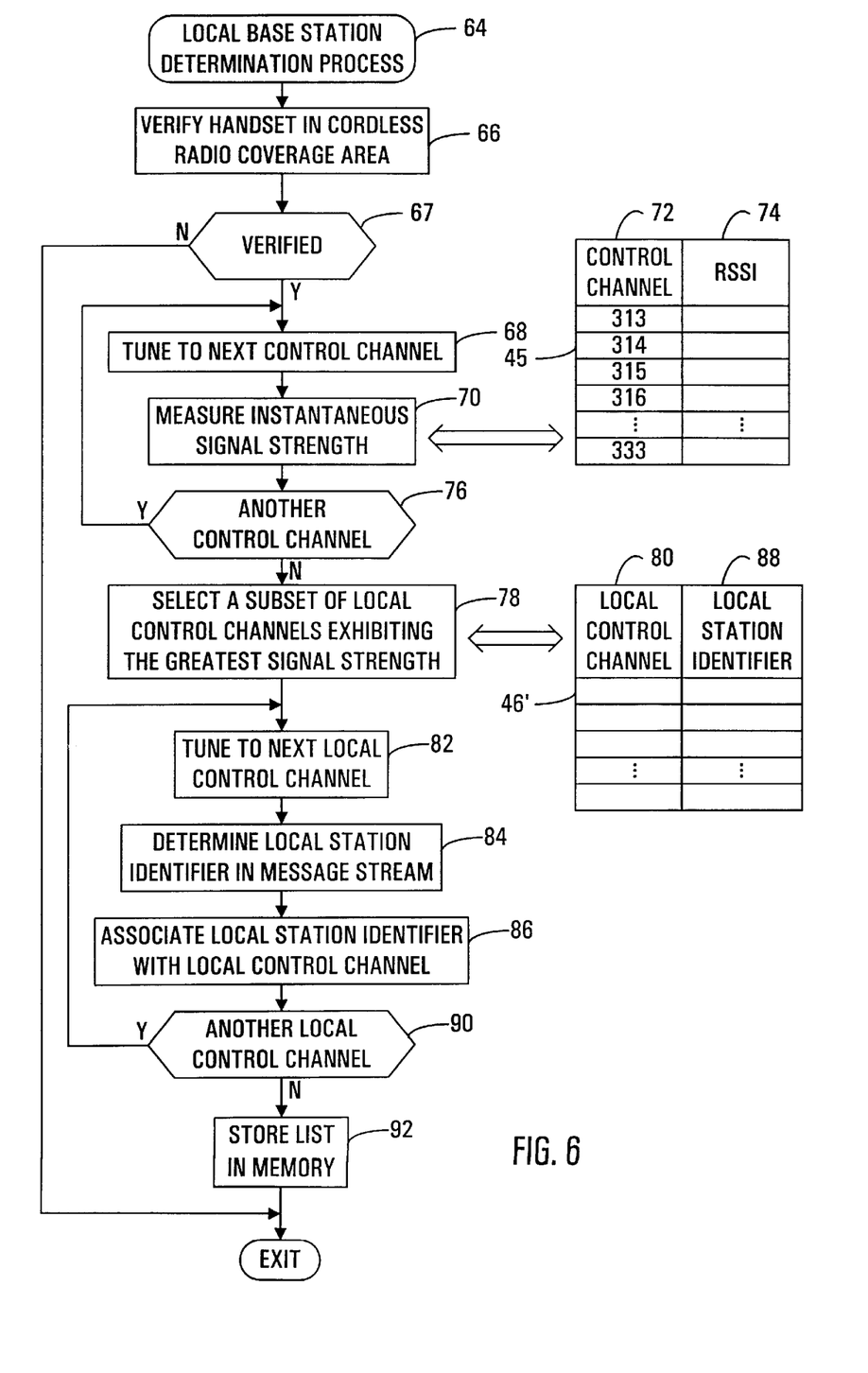
FIG. 6 shows a flow chart of a local cellular base station determination process performed by the radio communication device.

FIG. 6 shows a flow chart of a local cellular base station determination process 64 performed by handset 22 (FIG. 2). Process 64 is performed when multiple mode communication system 29 (FIG. 2) undergoes a first-time manual authorization process. Thereafter, process 64 is desirably automatically performed each time handset 22 is moved inside of cordless radio coverage area 26 (FIG. 2) after being outside of area 26. Furthermore, determination process 64 may be performed in conjunction with other communication channel selection processes, such as the selection of free or under-utilized channels for voice or data communication.

Determination process begins with a task 66. Task 66 causes handset 22 to verify that it is located inside of cordless radio coverage area 26 (FIG. 2). Verification task 66 may be performed at system 29 (FIG. 2) authorization by manual entry of commands into user interface 60 (FIG. 5) by the user. In an authorization process, handset 22 is placed physically near cordless base station 30 (FIG. 2). At this point, cordless base station 30 is RF-silent. In other words, it is not transmitting a pilot signal. Rather, task 66 causes handset 22 to transmit a message directed to cordless base station 30 to attempt registration. In response to the registration attempt message, cordless base station 30 returns an acknowledgment message to handset 22. Following authorization and while operating in the cellular mode, handset 22 periodically transmits a message to attempt cordless registration following the expiration of predetermined durations measured by timer 58 (FIG. 5), in response to a call attempt, and so forth.

In connection with verification task 66, a query task 67 is performed. Query task 67 causes handset 22 to determine if verification is successful. Verification task 66 is successful when handset 22 receives an acknowledgment message from cordless base station 30 (FIG. 2) in response to the registration attempt message sent by handset 22. If an acknowledgment message is not received, handset 22 is not in cordless radio coverage area 26 (FIG. 2), and process 64 exits. Although not shown in FIG. 6, a consequence of failing the verification of tasks 66 and 67 is that handset 22 may remain in its cellular mode of operation where it routes communications through cellular base stations 34 (FIGS. 1-2).

However, when query task 67 determines that handset 22 is in cordless radio coverage area 26, program control proceeds to a task 68. At this point, handset 22 is operating in its cordless mode, where future communications will be routed through cordless base station 30. Task 68 causes receiver 54 of handset 22 to tune to one of control channels 46 (FIG. 1) in a preferred band of control channels. For example, handset 22 may tune to one of the twenty-one control channels 46 allocated for use in an A-type cellular system.

In response to task 68, a task 70 causes handset 22 to ascertair a signal quality of the tuned-to control channel 46. In the preferred embodiment the signal quality is determined by measuring an instantaneous signal strength, or relative signal strength indicator (RSSI). In an analog communication system, the RSSI provides a snapshot of the signal quality of the tuned-to control channel 46 by measuring the radiofrequency energy of the detected control channel 46. However, in a digital communication system, task 70 may cause handset 22 to measure signal quality by detecting a bit error rate in the tuned-to control channel 46. In addition, those skilled in the art will recognize that there are other techniques for determining the signal quality of the tuned-to control channels 46.

Task 70 also causes handset 22 to retain the signal quality measurement. For example, the signal quality measurement may be retained in a temporary array 72 in handset memory 62 (FIG. 5). An exemplary temporary array 72 is illustrated in FIG. 6 showing a preferred block of control channels 46 in association with a measured RSSI value 74.

Following task 70, a query task 76 determines if another one of control channels 46 exists in temporary array 72 for which RSSI value 74 is to be measured. When query task 76 determines that another one of control channels 46 exists, program control loops back to task 68 for tuning to a subsequent one of control channels 46 and measurement of RSSI 74. Thus, tasks 68, 70, and 76 cause handset 22 (FIG. 5) to sequentially tune receiver 54 to each of control channels 46 and measure the current, or instantaneous, RSSI 74 when receiver 54 tunes to a specific one of control channels 46.

When query task 76 determines that there is not another control channel 46, in other words, when receiver 54 has been tuned to each of control channels 46 and RSSI 74 has been measured, program control proceeds to a task 78. The entire programming loop which includes tasks 68, 70, and 76 can be completed quickly because an instantaneous signal quality measurement for each single control channel 72 occurs quickly.

Task 78 causes controller 52 (FIG. 5) of handset 22 to select a subset of control channels 46 from temporary array 72 which exhibit an RSSI 74 that is greater than the nonselected control channels 46 from temporary array 72. Task 78 causes controller 52 to identify control channels 46 as local control channels 46' and to assemble local control channels 46' in an update list 80. In the preferred embodiment, update list 80 includes up to eight local control channels 46'. However, the number of local control channels 46' is system specific and depends largely on the number of cells 24 having cellular coverage areas 28 (FIG. 1) which may overlap one another in any geographic location within environment 20 (FIG. 1). In addition, update list 80 need not be separate from temporary array 72. Rather those control channels 46 that are identified as local control channels 46' may be flagged or otherwise denoted from the nonselected control channels 46 in array 72.

Following task 78, a task 82 causes receiver 54 (FIG. 5) of handset 22 to tune to one of local control channels 46' from update list 80. When tuned, receiver 54 is configured to receive message stream 48 (FIG. 4) which is being continuously broadcast over one of local control channels 46' by one of cellular base stations 34 (FIG. 2).

In connection with task 82, a task 84 causes controller 52 to determine cellular base station identifier 51 (FIG. 4) in message stream 48 of the tuned-to local control channel 46'. Determining identifier 51 from message stream 48 for a single local control channel 46' takes longer than merely determining signal quality for that channel. However, typically only a few local control channels 46' need to be evaluated, and the overall effect is slight.

Following task 84, a task 86 causes controller 52 to flag or otherwise denote the determined cellular base station identifier 51 as a local station identifier 88 in update list 80 and associate local station identifier 88 with its local control channel 46'. The local station identifier 88 is then a better-server identifier corresponding to a better-server cellular base station 34 for which a signal quality measure (RSSI 74) is better than the other cellular base station control channels 46. Thus, the better-server cellular base stations have a portion of their cellular radio coverage area 28 (FIG. 2) which overlies cordless radio coverage area 26 (FIG. 2).

Following task 86, a query task 90 determines if another one of local control channels 46' exists in update list 80 for which a local station identifier 88 is to be determined. When another one of local control channels 46' exists, process 64 loops back to task 82, so that tuning, determining, and associating tasks 82, 84, and 86 are performed for another one of local control channels 46'. Thus, tasks 82, 84, 86, and 90 cause handset 22 (FIG. 5) to sequentially tune receiver 54 to each of local control channels 46' and determine its associated local station identifier 88. In the preferred embodiment, cellular base station identifier 51 (FIG. 4) is sent approximately every eight seconds. Accordingly, receiver 54 tunes to each of local control channels 46' for up to eight seconds to allow sufficient time for local station identifier 88 to be determined.

When query task 90 determines that there are no other local control channels 46' for which a local station identifier 88 is to be determined, process 64 proceeds to a task 92. Task 92 causes controller 52 to store update list 80 in memory 62 (FIG. 5). If a list of local station identifiers already exists in memory 62, from a prior iteration of determination process 64, or from an activation session, discussed previously, controller 52 overwrites the preprogrammed list in memory 62 with update list 80. Following task 92, process 64 exits.

Process 64 is performed because system 29 is not preprogrammed for a specific geographic location. Hence, system 29 has no prior knowledge of which of cellular base stations 34 may be local cellular base stations until system 29 activation. Since, cordless base stations and handsets need not be pre-programmed by the supplier for a specific customer, systems 29 are far less complex than previous systems, less costly, and response time for delivery is quicker. Moreover, since process 64 is performed whenever handset 22 returns to its cordless radio coverage area 66, handset 22 is able to automatically adapt to changes in the cellular network, such as changes in radiofrequency allocation and the division of cells 34.

Figure 7:
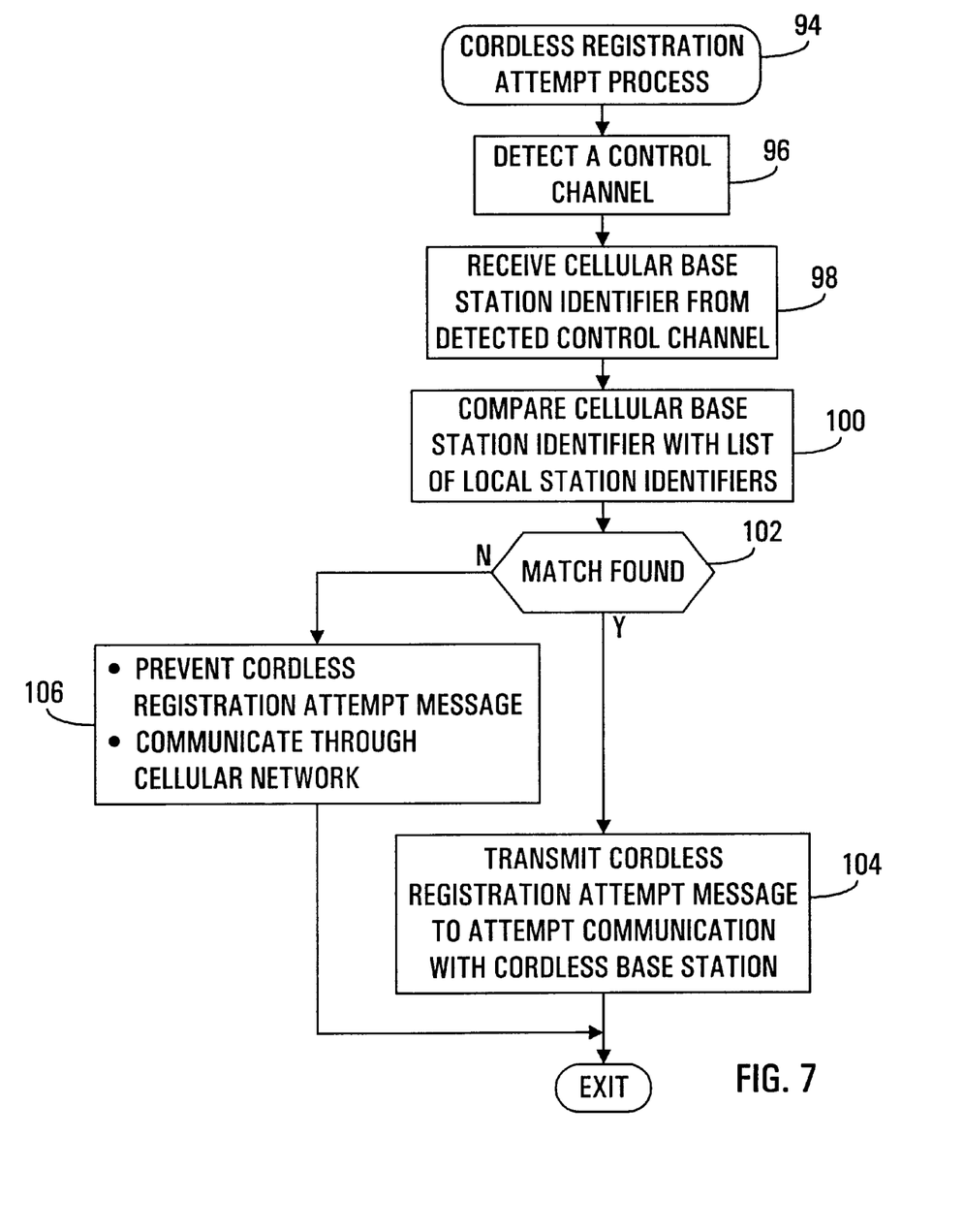
FIG. 7 shows a flow chart of a cordless registration attempt process performed by the radio communication device.

FIG. 7 shows a flow chart of a cordless registration attempt process 94 performed by handset 22 (FIG. 2). Process 94 is performed by handset 22 to attempt cordless communication with cordless base station 30 (FIG. 2). Cordless base station 30 is substantially RF-silent. In other words, cordless base station 30 does not continuously transmit a pilot signal which, when detected by handset 22, would indicate to handset 22 that it is located in cordless coverage area 26 (FIG. 2). Thus, cordless base station 30 remains RF-silent unless responding to a handset initiated request or unless paging a handset 22. Accordingly, process 94 is performed by handset 22, while operating in the cellular mode, to determine if it may be in cordless radio coverage area 26. Process 94 occurs each time handset 22 initializes, when handset 22 is operating in the cellular mode and attempting a call, when handset 22 loses the ability to reliably decode the current control channel selection (generally because of declining signal strength), or upon expiration of a predetermined duration established through the operation of timer 58 (FIG. 5).

Process 94 begins with a task 96. Task 96 causes handset 22 to electronically scan for and detect the radiofrequency of a continuously broadcast one of control channels 46 (FIG. 3) in the geographical location in which handset 22 is currently located. When one of control channels 46 is detected in task 96, process 94 proceeds to a task 98.

Task 98 causes handset 22 to receive cellular base station identifier 51 (FIG. 4) from message stream 48 (FIG. 4) broadcast over the detected one of control channels 46. As discussed in connection with message stream 48, cellular base station identifier 51 is desirably a unique cellular base station identifier code. Alternatively, station identifier 51 is a combination of the detected control channel 46 and a digital color code.

Following task 98, a task 100 is performed. Task 100 causes handset 22 to compare the received cellular base station identifier 51 with update list 80 (FIG. 6) of local station identifiers 88 which is stored in handset memory 62 (FIG. 5).

In connection with task 100, a query task 102 is performed. Query task 102 determines if a match is found between the received cellular base station identifier 51 and any one of local station identifiers 88 in update list 80. A match between cellular base station identifier 51 and local station identifiers 88 indicates that handset 22 may be in cordless radio coverage area 26.

When a match is found in query task 102, a task 104 is performed. Task 104 causes handset 22 to attempt communication with cordless base station 30. In other words, handset 22 is allowed to transmit a registration attempt message over a reverse portion of one of radiofrequency channels from pool of channels 42 (FIG. 3), known to and scanned by cordless base station 30. The location of handset 22 in cordless radio coverage area 26 is verified if cordless base station 30 acknowledges the transmitted registration attempt message. Thus cordless registration attempt process 94 is an antecedent, or a prior operation, that is performed prior to and a cause of initiating communication with cordless base station 30.

In addition, registration attempt process 94 is performed as an antecedent, or a prior operation, when repeating local base station determination process 64 (FIG. 6). In other words, determination process 64 is repeated when handset 22 moves inside of cordless radio coverage area 26 and reestablishes contact with cordless base station 30.

When a match is not found in query task 102, a task 106 is performed. Task 106 prevents handset 22 from transmitting a cordless registration attempt message to cordless base station 30. Thus, handset 22 communicates through one of cellular base stations 34 (FIG. 2) of the cellular network. Since transmission of a cordless base station access message from handset 22 is prevented when handset 22 cannot be in cordless coverage area 26, unnecessary, and interference causing, radiofrequency transmissions are avoided.

Following either of tasks 104 or 106, process 94 exits, and handset 22 communicates through either cordless base station 30 (FIG. 2) or cellular base station 34 (FIG. 2) using conventional cellular communication protocols.

In summary, a method and system are provided for allowing a radio communication device in a multiple mode communication system to attempt communication with a cordless base station. The method and system reduce the likelihood of interference imposed on the cellular network by cordless operation of the radio communication device by preventing the radio communication device from transmitting a cordless base station registration attempt message when the device determines that it is not in a radio coverage area of the cordless base station. The radio communication device takes an active role in determining which cellular base stations are broadcasting control channels in the cordless radio coverage area, and detects one of those control channels prior to transmitting a message to the cordless base station. In addition, the radio communication device automatically repeats the determination process each time it re-enters the cordless radio coverage so that it can adapt to changes in the cellular network frequency allocations.

Although the preferred embodiments of the invention have been illustrated and described in detail, it will be readily apparent to those skilled in the art that various modifications may be made therein without departing from the spirit of the invention or from the scope of the appended claims. For example, an alternate embodiment of the present invention may include more than one radio communication device. In this alternate embodiment, one radio communication device may be a "master" device and the other may be "slave" devices. The master device performs the local base station determination process, and transfers the list of local station identifiers to the cordless base station. The cordless base station may then convey this list to the slave devices so that each of the radio communication devices are programmed with the same update list of local station identifiers.

What is claimed is:

1. In a multiple mode communication system in which a radio communication device is configured to selectively communicate through a cellular network and a cordless base station using a common pool of channels, said cellular network having a plurality of cellular base stations, a method for allowing said radio communication device to attempt communication with said cordless base station, said method comprising the steps of:

selecting local control channels from a plurality of control channels, each of said local control channels exhibiting a better signal quality than nonselected ones of said control channels;

determining a local station identifier for each of said local control channels, said local station identifiers identifying said cellular base stations broadcasting said local control channels, said selecting and determining steps being performed by said radio communication device in a radio coverage area of said cordless base station;

receiving a cellular base station identifier at said radio communication device, said cellular base station identifier being transmitted over one of said plurality of control channels; and transmitting a message from said radio communication device when said received cellular base station identifier matches one of said local station identifiers without first detecting the presence of a pilot signal broadcast from said cordless base station.

2. A method as claimed in claim 1 further comprising the step of verifying that said radio communication device is in said radio coverage area prior to said selecting and determining steps.

3. A method as claimed in claim 1 wherein said signal quality is an instantaneous signal strength for a detected one of said control channels and said selecting step comprises the steps of:

sequentially tuning a receiver to each of said plurality of control channels, said control channels being continuously broadcast by associated ones of said cellular base stations; and for said each control channel, measuring said instantaneous signal strength of said control channel, said instantaneous signal strength being the radiofrequency energy detected by said receiver, and said instantaneous signal strength identifying ones of said control channels that are said local control channels.

4. A method as claimed in claim 1 wherein said determining step comprises the steps of:

sequentially tuning a receiver to each of said local control channels; and for said each local control channel, detecting said local station identifier from a message stream broadcast over said local control channel.

5. A method as claimed in claim 1 wherein said determining step comprises the step of programming a memory element of said radio communication device with said local station identifiers.

6. A method as claimed in claim 1 further comprising the step of preventing transmission of said message from said radio communication device when said received cellular base station identifier matches none of said local station identifiers.

7. A method as claimed in claim 1 wherein said radio communication device is configured to communicate through said cellular network when said radio communication device is moved outside of a radio coverage area of said cordless base station, and said method further comprises the step of repeating said selecting and determining steps when said radio communication device is moved inside of said cordless radio coverage area.

8. A method as claimed in claim 7 wherein said radio communication device includes a memory element into which said local station identifiers are programmed, and said repeated determining step comprises the step of replacing said programmed local station identifiers with updated local station identifiers.

9. A radio communication device configured to selectively communicate through a cellular network and a cordless base station using a common pool of channels, said cellular network having a plurality of cellular base stations, and said device comprising:

a controller configured to select local control channels from a plurality of control channels, each of said local control channels exhibiting an instantaneous signal quality which is greater than an instantaneous signal quality for nonselected ones of said control channels, and said controller being further configured to determine local station identifiers for said local control channels, said local station identifiers identifying said cellular base stations broadcasting said local control channels;

a receiver coupled to said controller and configured to receive a cellular base station identifier transmitted over one of said plurality of control channels; and a radio communication device transmitter coupled to said controller and configured to transmit a message when said cellular base station identifier matches one of said local station identifiers without first detecting the presence of a pilot signal broadcast from said cordless base station.

10. A radio communication device as claimed in claim 9 wherein said controller is further configured to prevent transmission of said message when said cellular base station identifier matches none of said local station identifiers.

11. A radio communication device as claimed in claim 9 further comprising a memory element coupled to said controller, said memory element being configured to store said local station identifiers.

12. A radio communication device as claimed in claim 9 wherein said radio communication device is configured to communicate through said cellular network when said radio communication device is moved outside of a radio coverage area of said cordless base station, and said controller is further configured to update said local station identifiers when said radio communication device is moved inside of said radio coverage area.

13. In a multiple mode communication system in which a radio communication device initiates communication with a substantially RF-silent cordless base station after said device determines it is located within radio coverage range of a cellular base station, a method of adapting said device and said cordless base station to said cellular base station comprising:

electronically detecting, within said radio communication device, a cellular base station control channel which exhibits better signal quality within a radio coverage area of said cordless base station than other cellular base station control channels, said detected control channel being transmitted by a better-server cellular base station;

verifying that said device is within radio coverage range of said better-server cellular base station; and initiating communication with said cordless base station without first detecting the presence of a pilot signal broadcast from said cordless base station, following said verifying operation.

14. A method as claimed in claim 13 additionally comprising the operation of verifying that said device is within radio coverage range of said cordless base station as an antecedent to repeating said electronically detecting operation.

15. A method as claimed in claim 14 additionally comprising determining a better-server identifier for said better-server cellular base station.

16. A method as claimed in claim 13 wherein:

said detecting operation detects a plurality of cellular base station control channels each of which exhibits better signal quality within said radio coverage area of said cordless base station than other cellular base station control channels;

said device determines a plurality of better-server identifiers corresponding to said plurality of control channels;

said device forms an updated list of better-server identifiers in response to said plurality of better-server identifiers; and said verifying operation is performed in said device in response to said updated list of better-server identifiers.

17. In a multiple mode communication system in which a radio communication device is configured to selectively communicate through a cellular network and a cordless base station using a common pool of channels, said cellular network having a plurality of cellular base stations, a method for allowing said radio communication device to attempt communication with said cordless base station, said method comprising the steps of:

a) tuning a receiver of said radio communication device to each of a plurality of control channels, said control channels being continuously broadcast by associated ones of said cellular base stations;

b) for said each control channel, measuring an instantaneous signal strength of said control channel, said measured instantaneous signal strength being the radiofrequency energy detected by said receiver;

c) selecting local control channels from said plurality of control channels, each of said local control channels exhibiting said instantaneous signal strength which is greater than said instantaneous signal strength for nonselected ones of said control channels, said step c) being performed by said radio communication device;

d) tuning said receiver to said each local control channel;

e) for said each local control channel, determining a local station identifier from a message stream broadcast over said local control channel, said local station identifier identifying one of said cellular base stations broadcasting said local control channel, said step e) being performed by said radio communication device;

f) receiving a cellular base station identifier at said radio communication device, said cellular base station identifier being transmitted over one of said plurality of control channels; and g) transmitting a message from said radio communication device when said cellular base station identifier matches one of said local station identifiers without first detecting the presence of a pilot signal broadcast from said cordless base station.

18. A method as claimed in claim 17 wherein said radio communication device is configured to communicate over said cellular network when said radio communication device is moved outside of a radio coverage area of said cordless base station, and said method includes repeating said steps a)–e) when said radio communication device is moved inside of said cordless radio coverage area.

* * * * *